(No Model.) 3 Sheets—Sheet 3.
A. M. KEISTER.
CORN HARVESTER.
No. 303,292. Patented Aug. 12, 1884.
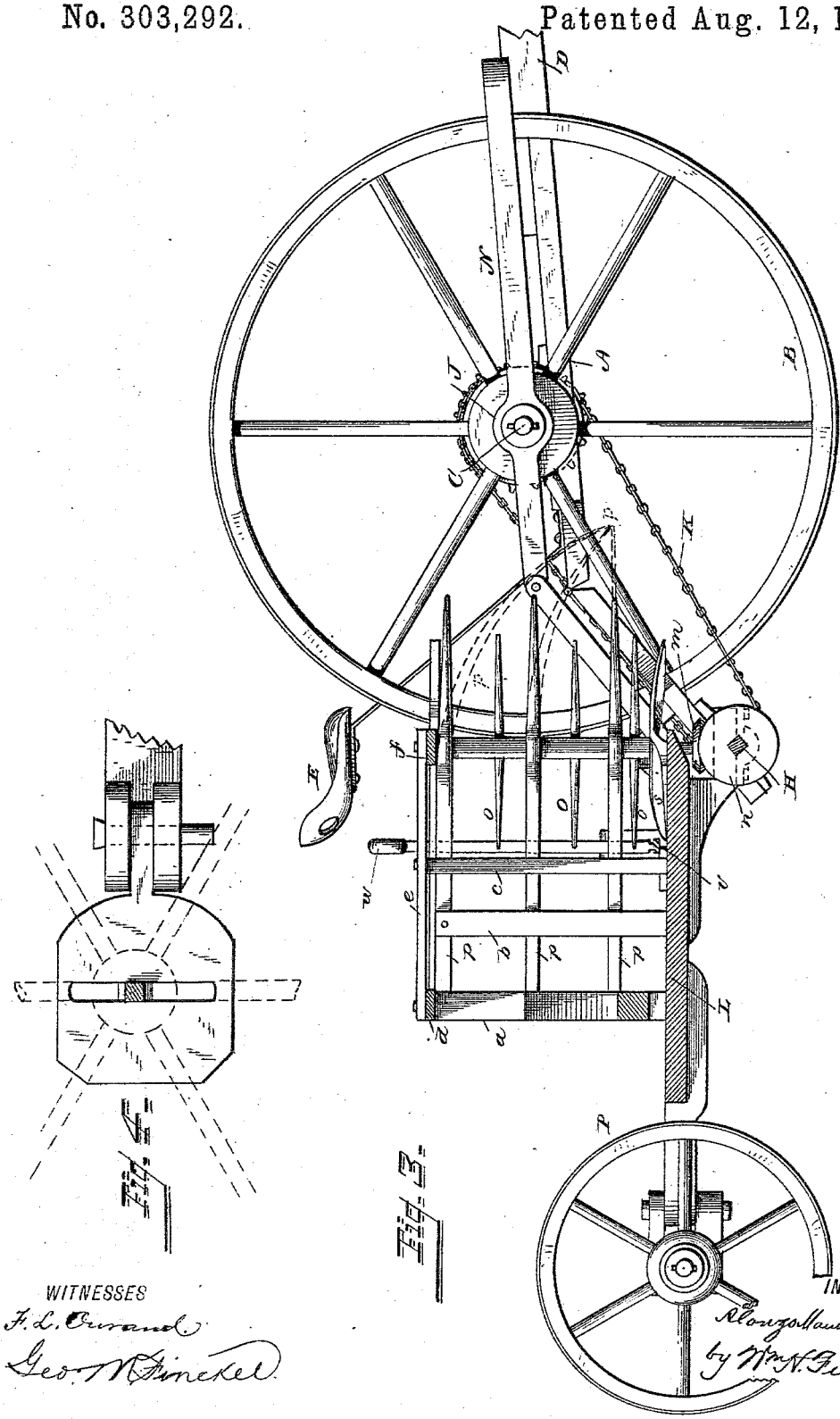
WITNESSES
F. L. Durand
Geo. N. Finckel
INVENTOR
Alonzo Manville Keister
by Wm N. Finckel
Attorney

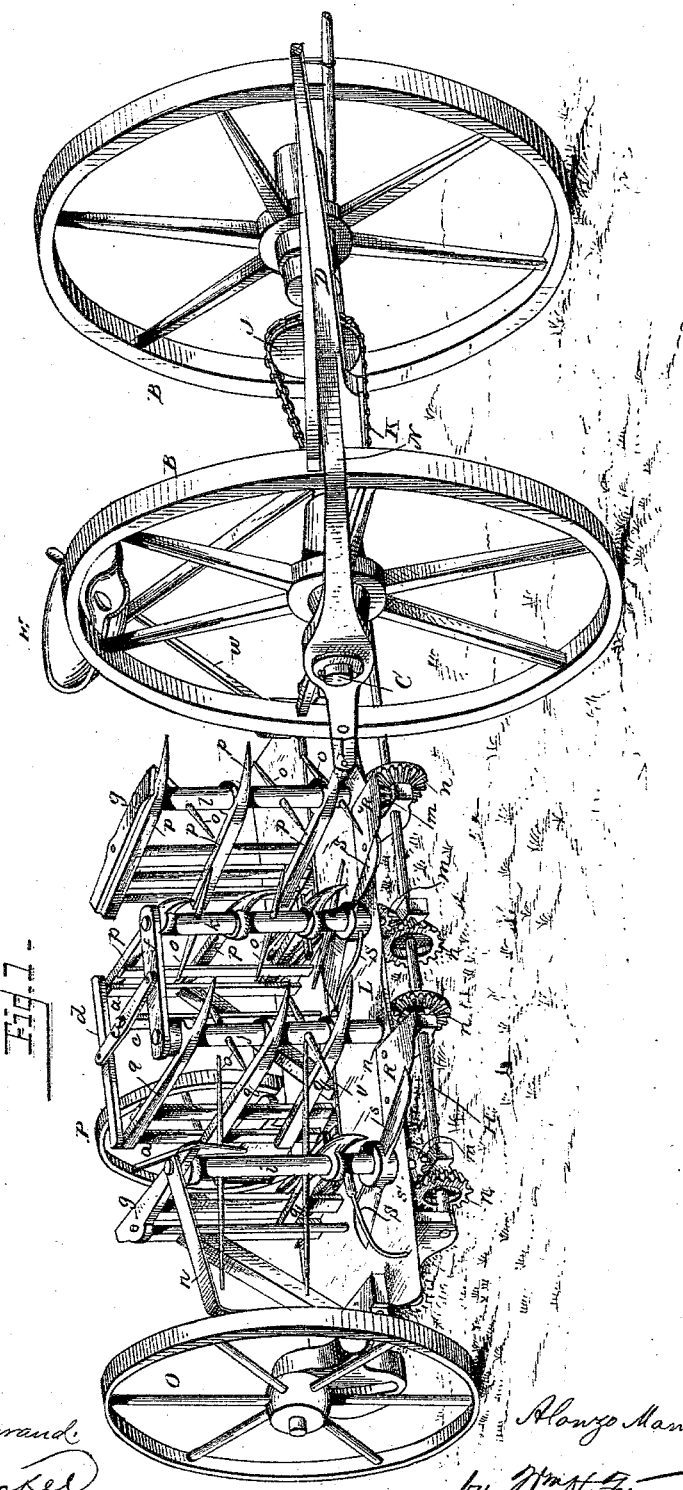

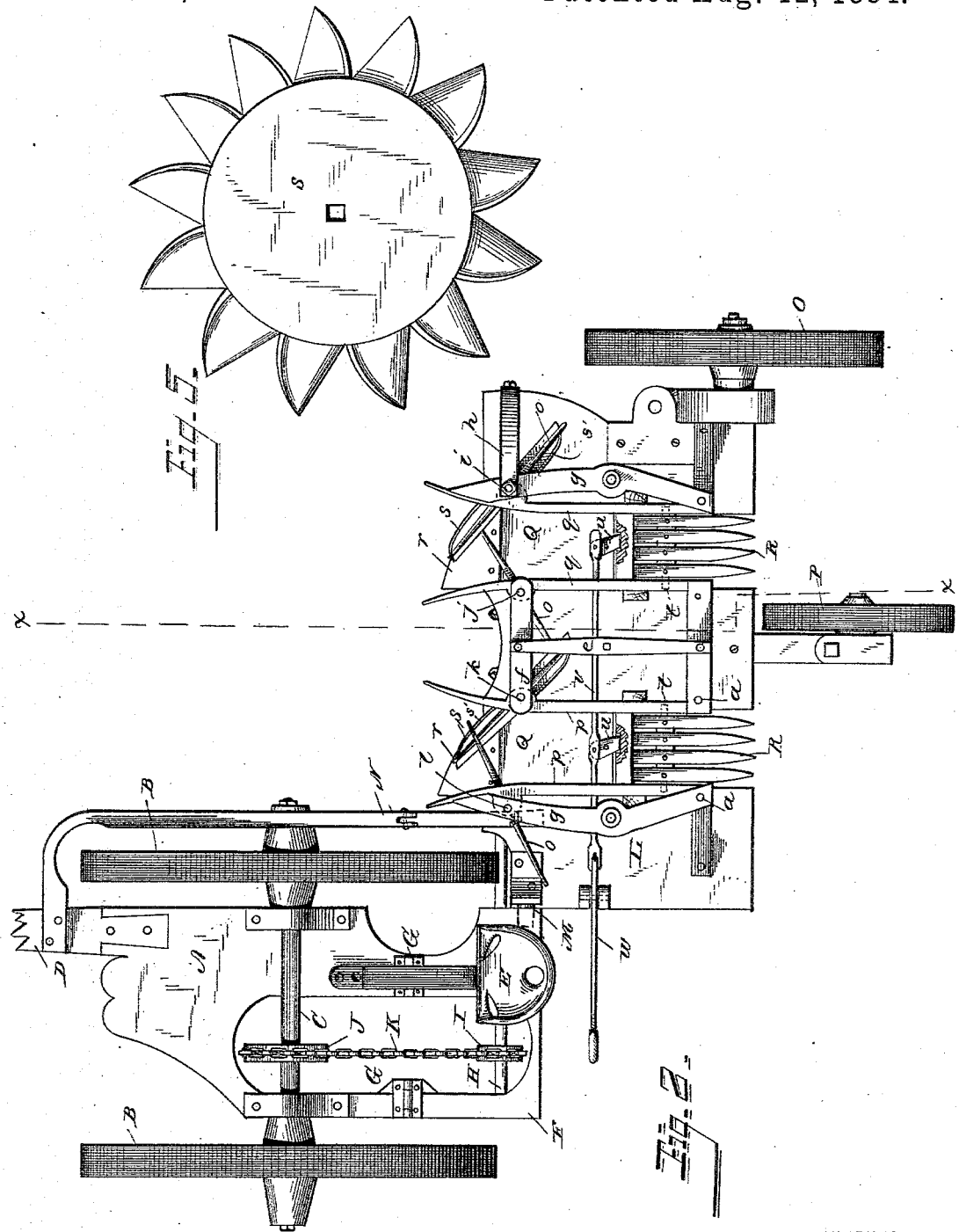

UNITED STATES PATENT OFFICE.

ALONZO MANVILLE KEISTER, OF SPOUT SPRING MILLS, VIRGINIA.

CORN-HARVESTER.

SPECIFICATION forming part of Letters Patent No. 303,292, dated August 12, 1884.

Application filed August 10, 1883. (No model.)

*To all whom it may concern:*

Be it known that I, ALONZO MANVILLE KEISTER, a citizen of the United States, residing at Spout Spring Mills, in the county of Frederick and State of Virginia, have invented certain new and useful Improvements in Corn-Harvesters, of which the following is a full, clear, and exact description.

This invention relates to certain improvements, hereinafter specifically set forth and claimed, in that class of agricultural machines designed for harvesting standing corn.

In the accompanying drawings, illustrating my invention, in the several figures of which like parts are similarly designated, Figure 1 is a perspective view looking at the front; Fig. 2, a top plan view; Fig. 3, a vertical section on the line $x\,x$, Fig. 2, enlarged, and showing in dotted lines a modification in the guide-fingers. Fig. 4 is a detail in side elevation, enlarged, of the rear wheel-support, and Fig. 5 is a top plan view, enlarged, of a modified form of cutter.

The carriage A is composed of a platform supported by wheels B B, on a shaft or axle, C, and provided with, say, a draft-pole, D, and a driver's seat, E. The rear portion, F, of this carriage is hung to the fore end by hinges G G, so as to admit of a free rising and falling movement of the two parts of the carriage in going over rough ground. This rear end of the carriage bears a shaft, H, having a sprocket-wheel, I, whereby it is driven from the main shaft or axle C through connection with its sprocket-wheel by the endless chain or belt K, and this belt may be kept taut by any of the well-known automatic belt-tighteners in use, which tightener may also serve to take up the slack of the belt when the rear end of the carriage is materially deflected. Power may in other obvious ways be transmitted from the shaft C to the pulley I.

L is the platform, and it is connected by a movable joint or pin, M, with the rear end of the carriage, and by a jointed brace, N, first with the shaft C or the hub of the wheel B, and then with the fore end of the carriage, so as to be supported at the end adjacent to the carriage by and on a level with the carriage. This brace N is jointed, first in line with the hinges G G connecting the two parts of the carriage, and again in line with the joint or pin M, substantially as shown in Figs. 1 and 2. The other end of this platform is sustained by an adjustable runner or wheel, O, of any usual construction, and the rear of said platform is kept in proper position by a swiveled wheel, P, adjustable in its box, substantially as indicated in Fig. 4, or in any well-known way. The shaft H is continuous of the length of the platform L, and is borne by and underneath the same in suitable boxes or hangers. Upright posts $a\,b\,c$ are arranged upon the platform, substantially as shown, and connected and braced into a frame-work by cross-pieces and ties $d\,e\,f$ and braces $g$ and $h$. The ends of the cross-piece $f$, and the front ends of the braces $g$ and $h$ form bearings for the upper ends of vertical shafts $i,\,j,\,k$, and $l$, and the said shafts are supported near their lower ends by shoulders in suitable boxes in the platform, said shafts extending thence through and below the platform, and each provided with a bevel gear-wheel, $m$, meshing with bevel-pinions $n$ on the shaft H, by the rotation of which said shafts $i\,j\,k\,l$ are rotated continuously in one direction. The shafts $i\,j\,k\,l$ are provided with horizontal fingers $o$ projecting radially therefrom, the fingers of adjacent shafts being arranged to cross and pass each other to constitute a reel, the shafts being arranged in pairs. The pairs of shafts $i\,j$ and $k\,l$ are aligned with the rear uprights, $a\,a$, and support, in connection with the said uprights, series of parallel horizontal fingers or guide-bars $p\,p\,q\,q$, the shafts turning freely in loose eyes in said bars, and the bars being sustained in place upon the shafts in any suitable manner, as by shoulders on or pins in said shafts. The rear ends of these bars are rigidly affixed to the uprights. The outer or fore ends of the pairs of bars $p\,p\,q\,q$ are curved from each other, as shown in Fig. 2, to make wide mouths for the channels or ways Q Q, formed by said pairs of bars. Attached to the platform in the mouths of these ways Q Q, are horizontal beveled-edged knives $r\,r$, and affixed to and rotated by the shafts $i\,k$ are knives $s\,s$ having straight edges which co-operate with the stationary knives $r\,r$ after the manner of shears, so that as the machine progresses through a field of standing corn the stalks are guided, and if fallen lifted by the fingers or reels $o\,o$ into position for the action of the knives, being by them cut and thrown by the fingers or reels in a standing position into the ways Q Q to make way for the next stalks. The cut stalks are taken by droppers or dumpers R R arranged in recesses or openings in the platform and discharged from the machine. These droppers are composed of fingers attached to shafts t t, which turn in bearings in or on the platform, and said droppers are locked in the plane of the platform by pivoted bolts u u on the platform, operated simultaneously to release or dump them to discharge the stalks by the rod v, actuated by a hand-lever, w, pivoted on the platform in convenient reach of the driver on his seat E. The droppers are preferably returned to their level in the platform by counterpoised heads, with which the bolts u u engage.

The machines may be made with any number of ways Q and knives. I have shown only two for illustration, and such a machine will serve to reap two rows of corn at a time.

Instead of independent parallel guide fingers or bars I may curve down their outer ends to a common meeting-point, as indicated by the dotted lines, Fig. 3, and secure such ends together. This form will be most serviceable in raising fallen corn to the action of the knives.

Instead of the two armed knives s, shown in Figs. 1, 2, and 3, I may employ a circular blade having a number of radial cutting-edges, as shown in Fig. 5.

S S are fingers attached to and rotating with the knife-shafts, such fingers being composed of spring metal, and their function being to pick up the corn, they to this end springing down from the front edge of the platform in their revolution, and again springing up onto it and sweeping over it. From this function I designate such fingers as "pickers."

The provision of the hinged rear end of the carriage holding the knife-driving shaft, the jointed brace N, and the swinging wheels O P admit of the movement of the reaper over a field without materially deflecting the cutting apparatus.

Suitable clutch mechanism may be employed in connection with the sprocket-wheels I or J to stop or start the rotation of the shaft H, and consequently the operation of the cutting mechanism when desired. The knives s are curved upward from their cutting-edges to their backs, which latter have guards s', so as to hold up the corn for the reels to prevent it from slipping off.

What I claim is—

1. In a corn-harvester, the carriage provided with a rear portion, F, hinged thereto in a plane parallel to the axle, a mechanism for cutting and gathering the stalks jointed to said hinged rear portion in a similar plane, the driving-shaft H for such cutting mechanism carried by such rear portion of the carriage, and the pivot M, jointed brace N, and wheels O P, to support the cutting apparatus, combined substantially as shown and described.

2. The combination, substantially as shown and described, of the platform, the fixed members of the cutting mechanism thereon, the rotary shafts, the moving members of the cutting mechanism thereon, the reels on said shafts, uprights on said platform in the rear of the shafts, and the series of curved bars connecting said shafts and uprights to form ways into which the cut corn is thrown by the reels for discharge.

3. The combination, substantially as shown and described, of the platform, the fixed members of the cutting mechanism thereon, the rotary shafts, the moving members of the cutting mechanism thereon, the reels on said shafts, uprights on said platform in the rear of the shafts, the series of curved bars connecting said shafts and uprights to form ways into which the cut corn is thrown by the reels for discharge, and the dump-cradles R, pivoted in the platform and provided with the catches u, and their operating mechanism, as set forth.

4. The combination, with the rotary shafts and reels, the cutting mechanism, and guide-fingers, of the spring-pickers S, substantially as shown and described.

In testimony whereof I have hereunto set my hand this 7th day of August, A. D. 1883.

ALONZO MANVILLE KEISTER.

Witnesses:
 WM. BYRD,
 R. E. GRIFFITH.